US012643745B2

(12) United States Patent

Lauze et al.

(10) Patent No.:  US 12,643,745 B2

(45) Date of Patent:  Jun. 2, 2026

(54) MODULAR SPREADER DEVICE KIT AND METHOD OF ASSEMBLY

(71) Applicants: Kevin Lauze, Topsham, ME (US);
Richard Hamm, Drummondville (CA)

(72) Inventors: Kevin Lauze, Topsham, ME (US);
Richard Hamm, Drummondville (CA)

( * ) Notice: Subject to any disclaimer, the term of this patent is extended or adjusted under 35 U.S.C. 154(b) by 0 days.

(21) Appl. No.: 19/422,714

(22) Filed: Dec. 17, 2025

(65) Prior Publication Data

US 2026/0145886 A1      May 28, 2026

Related U.S. Application Data

(63) Continuation of application No. 18/392,170, filed on Dec. 21, 2023, now Pat. No. 12,503,317.

(60) Provisional application No. 63/434,107, filed on Dec. 21, 2022.

(51) Int. Cl.
*B65G 47/18*        (2006.01)
*B65G 47/19*        (2006.01)
*B65G 47/51*        (2006.01)

(52) U.S. Cl.
CPC ......... *B65G 47/19* (2013.01); *B65G 47/5195* (2013.01); *B65G 2207/30* (2013.01); *B65G 2812/02029* (2013.01)

(58) Field of Classification Search
CPC ..... B65G 47/18; B65G 47/19; B65G 47/5195
USPC ......... 198/528, 532, 540, 550.01; 193/4, 11, 193/14, 25 A
See application file for complete search history.

(56) References Cited

U.S. PATENT DOCUMENTS

| | | | | |
|---|---|---|---|---|
| 3,450,440 | A * | 6/1969 | Klaus ....................... | A24C 5/39 |
| | | | | 198/525 |
| 5,072,491 | A * | 12/1991 | Pinto ..................... | D01G 13/00 |
| | | | | 19/145.5 |
| 5,735,386 | A * | 4/1998 | Epp ........................ | B65G 65/42 |
| | | | | 198/550.1 |
| 6,216,850 | B1 * | 4/2001 | Svejkovksy ........... | B65G 47/19 |
| | | | | 198/771 |
| 8,408,382 | B2 * | 4/2013 | Pano ..................... | A47J 31/404 |
| | | | | 222/240 |
| 8,800,752 | B2 * | 8/2014 | Sammons ............ | A01K 5/0266 |
| | | | | 198/550.4 |
| 8,915,347 | B2 * | 12/2014 | Hoppel ................ | A01D 43/063 |
| | | | | 414/528 |
| 9,296,568 | B2 * | 3/2016 | Peterson .............. | A01C 15/122 |
| 10,494,199 | B2 * | 12/2019 | Roberge .............. | A01C 21/002 |
| 10,844,881 | B2 * | 11/2020 | Fange-Larsen ........... | B24C 5/02 |
| 12,089,539 | B1 * | 9/2024 | Amass ................... | A01G 13/37 |

* cited by examiner

*Primary Examiner* — Douglas A Hess

(57) ABSTRACT

A modular spreader device kit and method of assembling that allows for the cost-effective transportation of a spreader device and enables an end user to easily assemble the device.

15 Claims, 6 Drawing Sheets

SECTION A-A

FIG. 8

Method of Installation – Whole Spreader - 1000

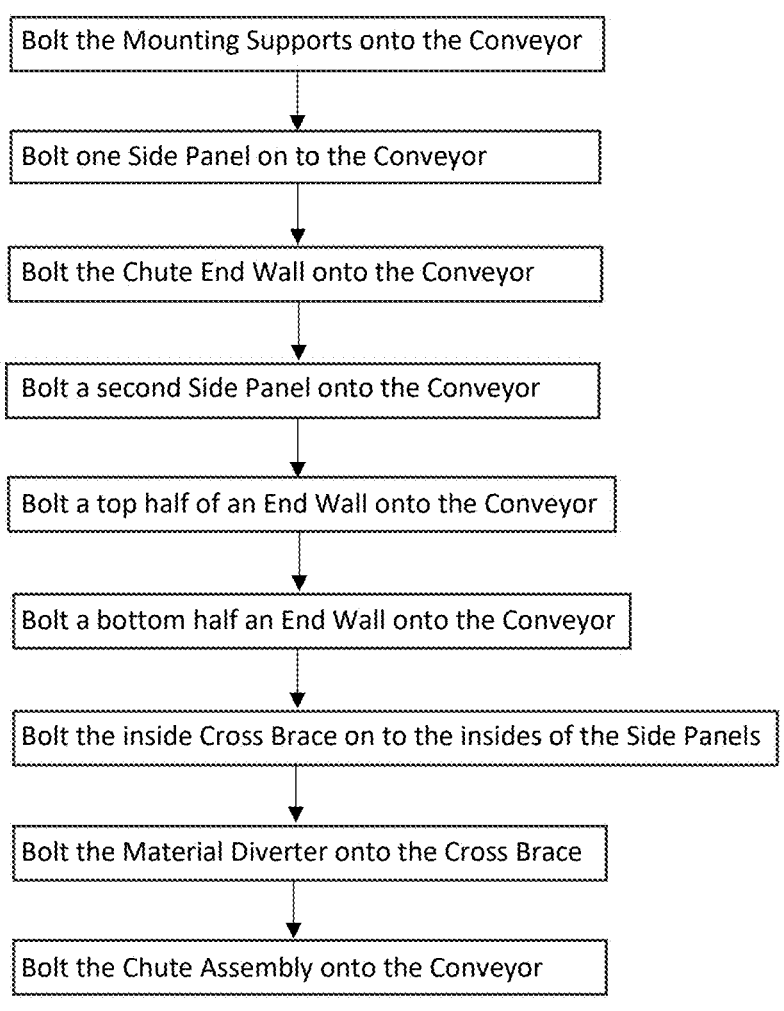

Bolt the Mounting Supports onto the Conveyor

Bolt one Side Panel on to the Conveyor

Bolt the Chute End Wall onto the Conveyor

Bolt a second Side Panel onto the Conveyor

Bolt a top half of an End Wall onto the Conveyor

Bolt a bottom half an End Wall onto the Conveyor

Bolt the inside Cross Brace on to the insides of the Side Panels

Bolt the Material Diverter onto the Cross Brace

Bolt the Chute Assembly onto the Conveyor

FIG. 9

Method of Chute Bottom Assembly – 1100

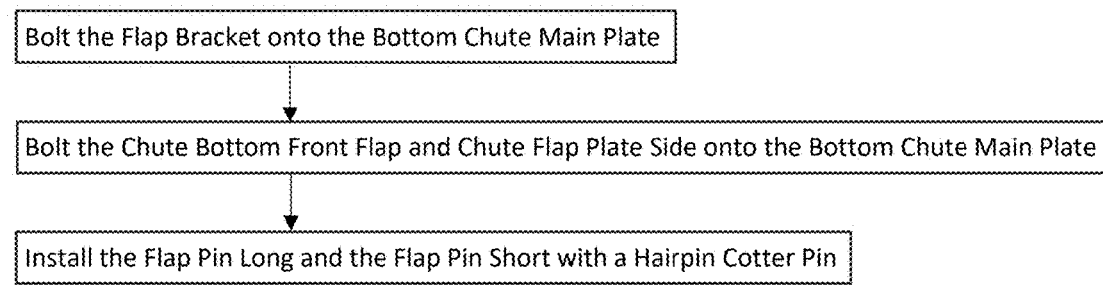

Bolt the Flap Bracket onto the Bottom Chute Main Plate

Bolt the Chute Bottom Front Flap and Chute Flap Plate Side onto the Bottom Chute Main Plate Install the Flap Pin Long and the Flap Pin Short with a Hairpin Cotter Pin

FIG. 10

Method of Chute Assembly – 1200

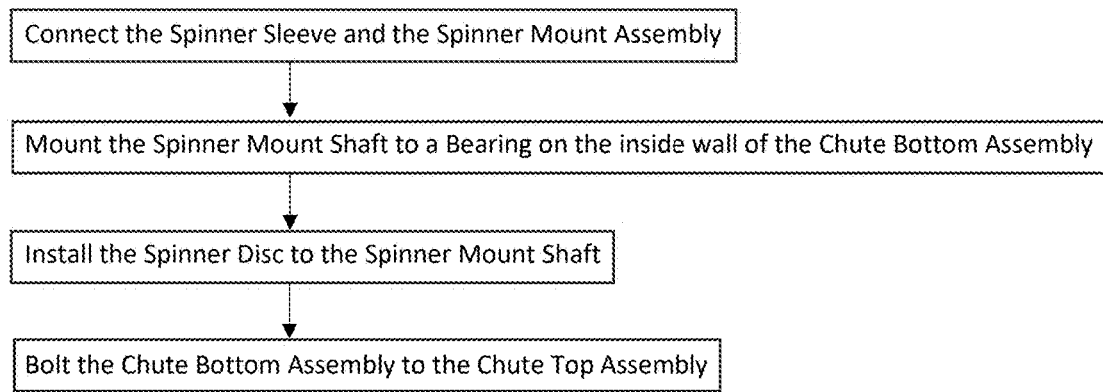

Connect the Spinner Sleeve and the Spinner Mount Assembly

Mount the Spinner Mount Shaft to a Bearing on the inside wall of the Chute Bottom Assembly Install the Spinner Disc to the Spinner Mount Shaft Bolt the Chute Bottom Assembly to the Chute Top Assembly

MODULAR SPREADER DEVICE KIT AND METHOD OF ASSEMBLY

BACKGROUND INFORMATION

Field of the Invention

The invention relates to kits for the modular assembly of spreader devices, and in particular, spreader devices configured to spread materials such as salt, sand, and/or fertilizer.

Discussion of Prior Art

Spreader devices, such as sand and salt spreaders, or fertilizer spreaders, are devices that typically fit in a truck bed or attach to the back of a utility vehicle such as a tractor, and that are configured to hold and dispense a material, such as sand, salt, or fertilizer, over a defined path behind the vehicle.

Such spreaders are typically made of a durable material, such as stainless steel, and while they come in variable shapes and sizes, all have considerable weight. For example, a spreader that has a 9-foot-long hopper with a 4-foot height and a 5.1 cubic yard capacity might have a dry weight of 2,250 pounds.

While these devices are known to work well and serve many different functions, shipping and transporting such large and heavy devices is problematic and results in a very high cost to the parties.

What is needed, therefore, is a conveyor kit and method of assembly that allows for the easy packaging and transportation of said conveyor and that allows the conveyor to be easily assembled once it reaches its destination.

BRIEF SUMMARY OF THE INVENTION

The invention is a modular spreader device kit and method of assembling that allows for the cost-effective transportation of a spreader device and enables an end user to easily assemble the device, the kit fitting inside a single container for shipment.

In general, an individual kit includes sidewalls, end walls, a conveyor assembly, a chute assembly, one or more mounting supports, and inner cross braces. While the details and specific configurations may vary, the end walls, sidewalls, and mounting supports are each configured to form a hopper above the conveyor assembly. The cross braces extend from one side wall to the other. The chute assembly includes a top assembly and bottom assembly that are coupled together and that contain a spinner. The conveyor assembly is adapted to convey the deliverable material for the assembled hopper to the chute assembly where the spinner is configured to disperse the deliverable materials in a radial pattern.

Conventional fasteners are used to assemble the spreader device once it reaches its destination. Once assembled, the spreader device is placed in, or attached to, a delivery vehicle. The deliverable material is then loaded into the hopper on top of the conveyor and, as the delivery vehicle moves over a desired delivery path, the conveyor assembly moves the materials into the chute assembly and the spinner distributes the materials over the path.

The entire kit is convenient to ship and, once onsite, easy to assemble by those having a reasonable level of skill.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 8 illustrates the steps in the method of assembling the spreader device.

FIG. 9 illustrates the steps in the method of assembling the chute.

FIG. 10 illustrates the steps in the method of assembling the chute.

DETAILED DESCRIPTION OF THE INVENTION

Figure 1:
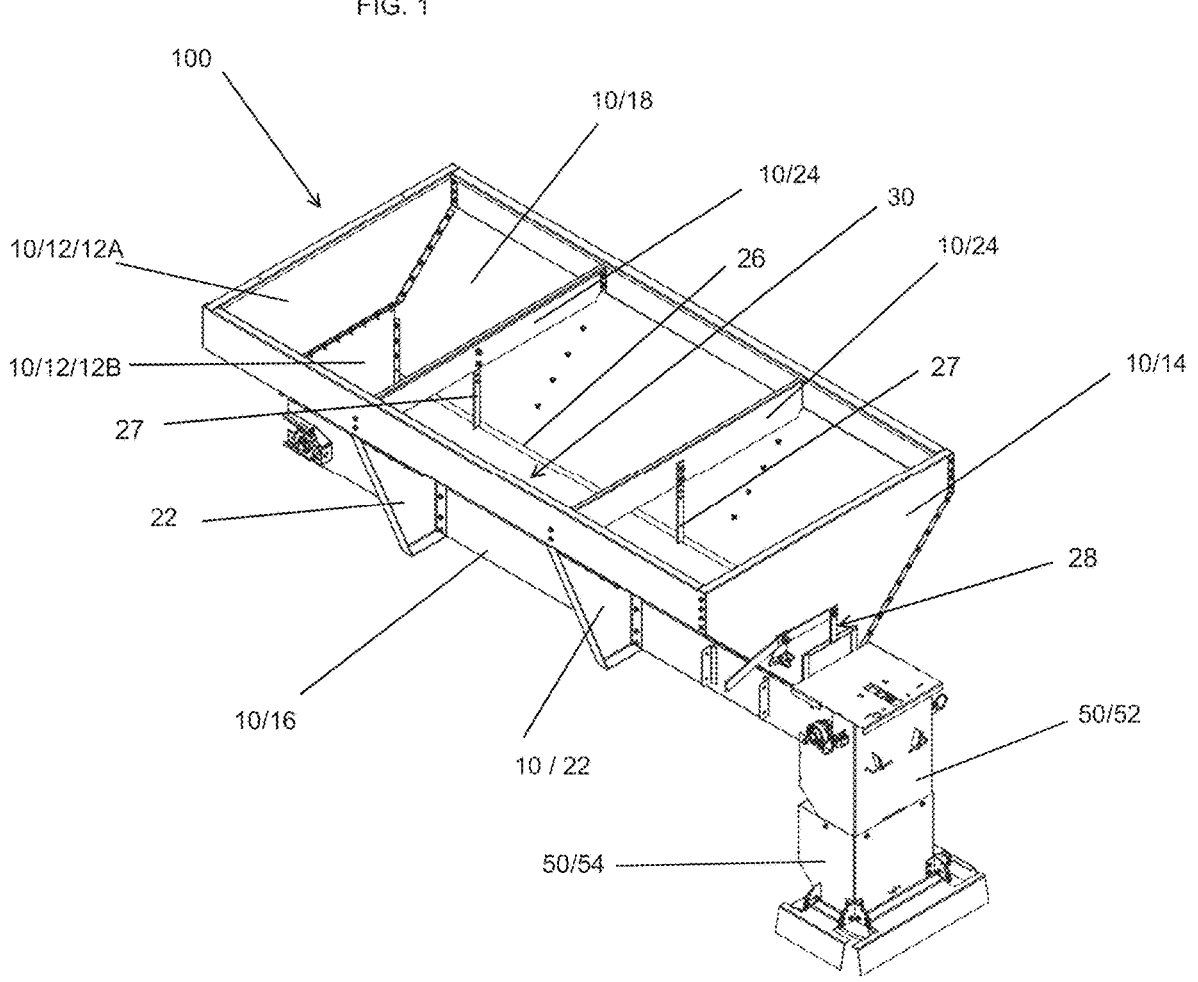
FIG. 1 is a perspective view showing the top, end, and side of a fully assembled spreader device according to the invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-7 illustrate a kit 100 for assembling modular spreading device 1, and FIGS. 8-10 illustrate a method of assembly 1000, according to the invention. The kit 100 includes a plurality of panels 10, a conveyor assembly 30, and a chute assembly 50. Collectively, the panels 10, conveyor assembly 30, and chute assembly 50 may be packaged in a single container for shipment to the intended destination. Once the package has arrived at that destination the components may be unpacked and the spreading device assembled using conventional fasteners such as nuts, bolts, and washers.

Figure 2:
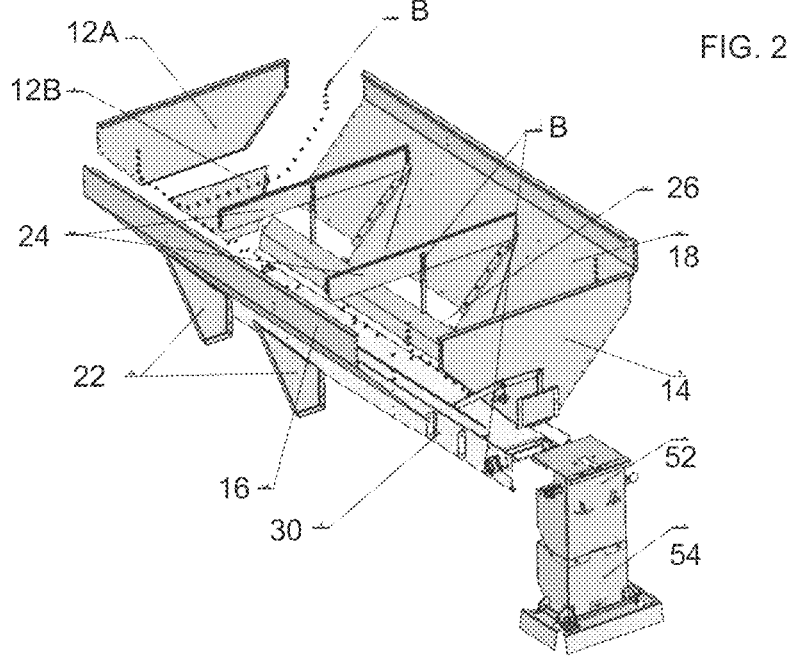
FIG. 2 is an exploded drawing of the spreader device.
Figures 3, 4, 5:
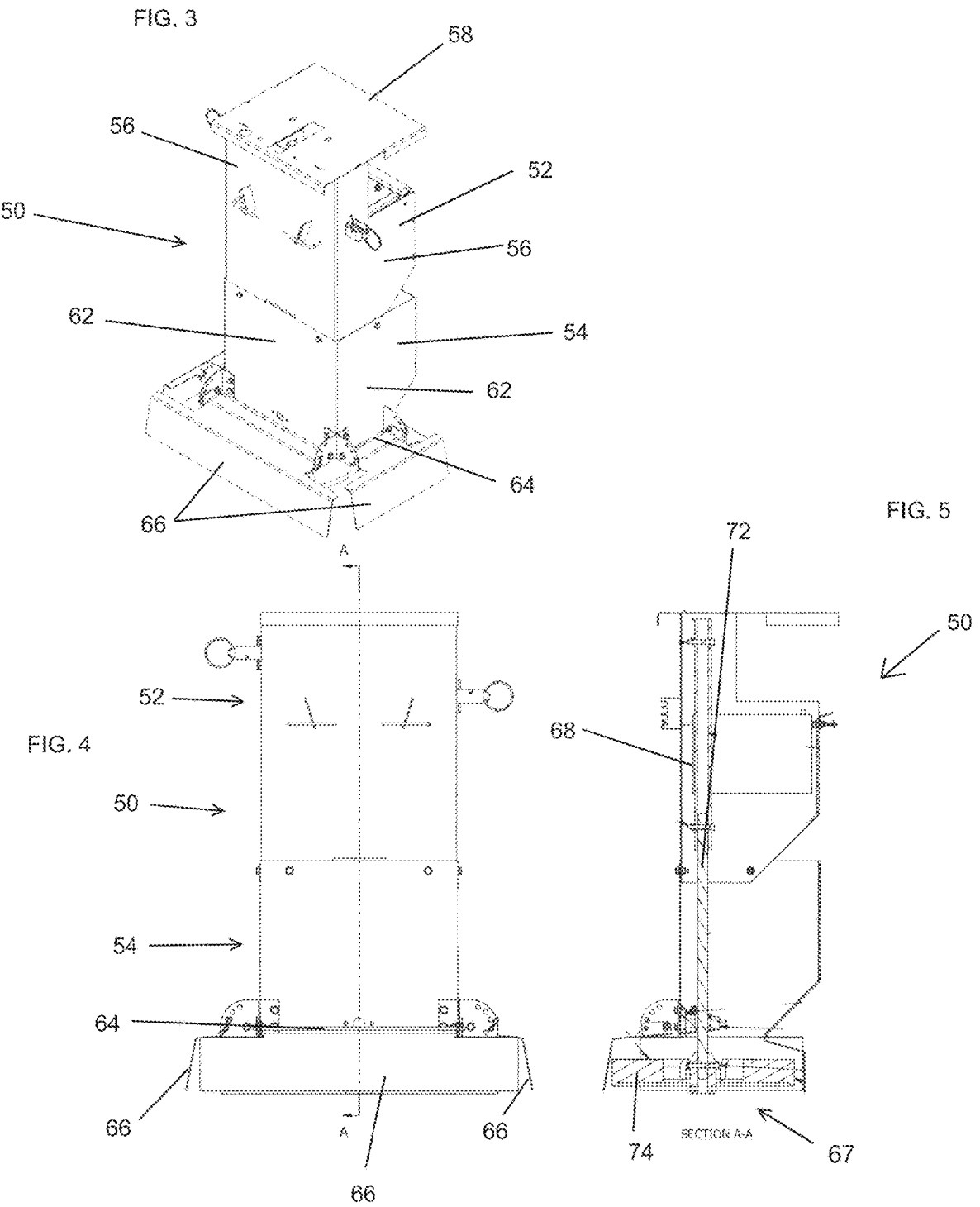
FIG. 3 is a perspective view of the chute assembly showing the top, back, and side of the assembly.
FIG. 4 is a back plane view of the chute assembly.
FIG. 5 is a cross-sectional view of the chute assembly along the line A-A shown in FIG. 4.
Figures 6, 7:
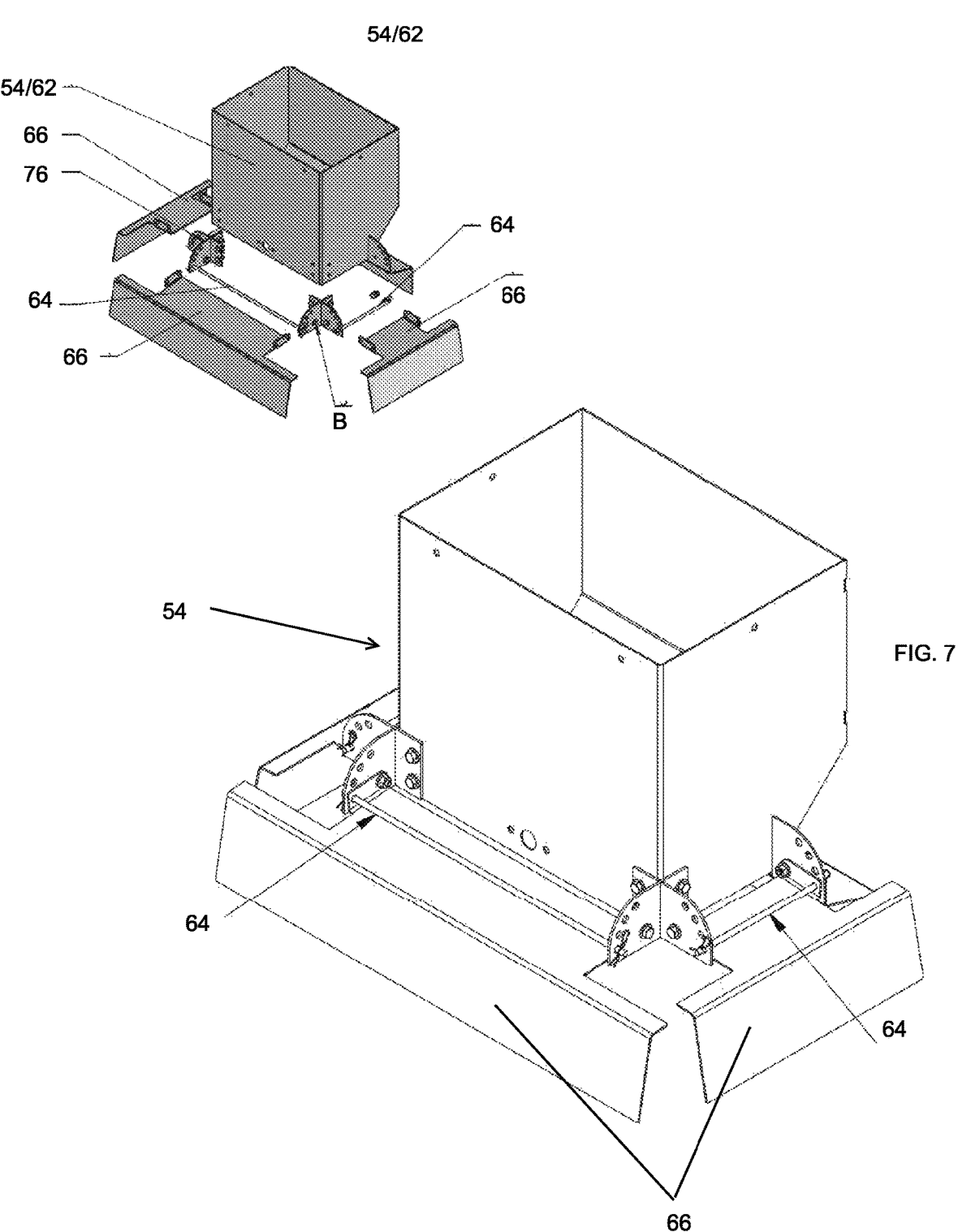
FIG. 6 is an exploded view of the lower portion of the chute assembly.
FIG. 7 is a perspective view of the lower portion of the chute assembly showing the top, back, and side.

In the embodiment shown in FIGS. 1 and 2, the plurality of panels 10 includes a first end wall 12, a second end wall 14, a first sidewall 16, and a second sidewall 18, which are configured to be attached to one another to form a hopper. The plurality of panels also includes a pair of mounting supports 22, and the first end wall 12 includes an upper end wall 12A and a lower end wall 12B. The second end wall 14 has a door 28 that allows materials to exit the hopper and enter the chute assembly 50. A pair of cross-brace panels 24 are also provided. A material diverter 26 helps to direct the materials onto the conveyor assembly 30. The material diverter may be attached to the cross braces 24 by a support post 27 and/or they may be attached directly to a sidewall 16, 18 and/or the conveyor assembly 30. When assembled together the plurality of panels combine to form a hopper.

The chute assembly 50, best shown in FIGS. 3-7, includes an upper chute assembly 52 and a lower chute assembly 54. The upper chute assembly 52 is essentially comprised of four sidewalls 56 and a top 58 and is configured to mount around an end of the conveyor and facilitate the materials passing from the conveyor 30 to the lower chute assembly 54 where the materials are dispersed.

The lower chute assembly 54 includes four sidewalls 62, with upper portions of the sidewalls that are adapted to connect to the upper chute assembly 52. Lower portions of the chute assembly 54 are connected by flip pins 64 to pivotable flap panels 66. Inside the chute assembly 50 is a spinner assembly 67. The spinner assembly 67 includes spinner sleeve 68 that contains a spinner shaft mount 72, and spinner plate 74. The spinner shaft mount 72 is connected on an upper end to a host vehicle motor and on a bottom end to the spinner plate 74. The spinner plate 74 is generally circular in shape and configured to spin about the spinner mount shaft in order to disperse the materials. Flap bracket assemblies 76 may also be provided.

The conveyor assembly 30 is shipped in a ready-to-use configuration, and once the kit is assembled, the conveyor assembly 30 only needs to be connected to a host unit power system (not shown), such as a hydraulic system, in order to be operational. The conveyor assembly 30 is a conventional system, a number of which are commercially available, that includes a base that encloses a plurality of conveyor rails that are operated by a drive system and around which a conventional conveyor belt runs. The conveyor rails may, for example, include a drive shaft having a plurality of sprockets that is connected to the drive system and a tail shaft that also has a plurality of sprockets. The conveyor belt may be any suitable belt, such as, for example, a stainless steel flat wire belting. The drive system may be any suitable conventional system, such as a hydraulic drive system connected to a gear box that drives the rail. In the example of a hydraulic system, the drive system on the spreader device 100 would be connected to and controlled by a hydraulic pump conventionally provided by the host vehicle.

As noted above, FIGS. 8-10 illustrate the method of assembly for the whole spreader 1000, of the bottom chute assembly 1100, and of the total chute assembly 1200. To assemble the spreader device the chute assembly should be assembled first. The sidewalls of the upper and lower chute assemblies are delivered in an assembled configuration as a part of the kit, along with the flap panels. To assemble the chute assembly, first connect the spinner sleeve to the spinner mount shaft with a nut and bolt. Then, mount the spinner mount shaft to a bearing on the inside of the lower chute assembly. Next, install the spinner disc to the spinner mount shaft using a nut and bolt. Finally, use a threaded fastener to couple the lower chute assembly onto the upper chute assembly.

After the chute assembly is assembled, the spreader device may be assembled. First, attach the mounting supports onto the conveyor assembly with a threaded fastener. Next attach the first sidewall to the conveyor assembly and then the second end wall to the first sidewall. Attach the second sidewall to the conveyor assembly with a threaded fastener, then attach the first end wall top portion to the sidewalls and the first end wall bottom portion to the sidewalls. Attach the cross braces to the side panels with threaded fasteners. Attach the material diverter on the cross brace with threaded fasteners. Lastly, attach the chute assembly onto the conveyor with threaded fasteners.

As used herein, threaded fastening elements, and other fastening, joining, and attachment mechanisms, include but are not limited to: threaded fasteners such as machine screws, self-tapping screws, thread-forming screws, shoulder bolts, set screws (grub screws), studs, captive fasteners, threaded inserts (including metallic, polymeric, molded-in, or press-fit inserts), thread-repair inserts (including heli-coil-6 type inserts), knurled inserts, and expansion-type threaded fasteners; rivets and permanent mechanical fasteners, including solid rivets, blind rivets (pop rivets), structural rivets, drive rivets, and clinch-type fasteners such as self-clinching nuts, studs, and pins; pins and pin-based retention devices, including roll pins (spring pins), dowel pins, taper pins, ball-lock pins, detent pins, snap-fit pins, and retaining pins; quick-release and quarter-turn fasteners, including quarter-turn fasteners, bayonet-style connectors, cam-lock fasteners, over-center latches, toggle clamps, and similar mechanisms; press-fit and interference-based attachment mechanisms, including press-fit joints, interference fits, shrink fits, and expansion fasteners; Adhesive-based bonding systems, including structural adhesives, epoxies, anaerobic adhesives, acrylic adhesives, polyurethane adhesives, pressure-sensitive adhesives, and tape-based bonding systems; welding and metallurgical joining techniques, including spot welding, MIG welding, TIG welding, laser welding, ultrasonic welding, friction welding, brazing, and soldering; hybrid or combined fastening systems, including combinations of mechanical fasteners and adhesives, pins and clamps, threaded fasteners with locating features, and snap-fit features with secondary locking mechanisms; and ancillary retention and securing elements, including spring clips, retaining rings (internal and external), circlips, wire forms, and elastic bands or straps for industrial or structural applications.

It is understood that the embodiments described herein are merely illustrative of the present invention. Variations in the construction of the spreading device may be contemplated by one skilled in the art without limiting the intended scope of the invention herein disclosed.

What is claimed is:

1. A modular spreader device kit comprising:
a plurality of panels configured to form a hopper when assembled, the plurality of panels including a first end wall, a second end wall, a first sidewall, and a second sidewall;
a conveyor assembly configured to convey deliverable material from the hopper;
a chute assembly including an upper chute assembly and a lower chute assembly, and located horizontally outside the perimeter of the hopper, the chute assembly configured to receive the deliverable material from the conveyor assembly;
a spinner assembly disposed within the chute assembly and configured to disperse the deliverable material in a radial pattern; and
wherein the plurality of panels, conveyor assembly, and chute assembly are configured to be packaged in a single container for shipment and assembled using conventional fasteners.

2. The modular spreader device kit of claim 1, wherein the first end wall includes an upper end wall and a lower end wall.

3. The modular spreader device kit of claim 1, wherein the second end wall includes a door configured to allow materials to exit the hopper and enter the chute assembly.

4. The modular spreader device kit of claim 1, further comprising a pair of mounting supports configured to attach the plurality of panels to the conveyor assembly.

5. The modular spreader device kit of claim 1, further comprising a pair of cross-brace panels extending from the first sidewall to the second sidewall.

6. The modular spreader device kit of claim 5, further comprising a material diverter configured to direct materials onto the conveyor assembly, the material diverter attached to the cross-brace panels by a support post.

7. The modular spreader device kit of claim 1, wherein the spinner assembly comprises:
    a spinner sleeve;
    a spinner shaft mount connected to the spinner sleeve; and
    a spinner plate connected to the spinner shaft mount and configured to spin about the spinner shaft mount.

8. The modular spreader device kit of claim 1, wherein the lower chute assembly includes four sidewalls with upper portions adapted to connect to the upper chute assembly and lower portions connected by flip pins to pivotable flap panels.

9. The modular spreader device kit of claim 1, wherein the conveyor assembly is shipped in a ready-to-use configuration and configured to be connected to a host unit power system.

10. The modular spreader device kit of claim 9, wherein the host unit power system comprises a hydraulic system.

11. A method of assembling a modular spreader device comprising:
    assembling a chute assembly by connecting a spinner sleeve to a spinner mount shaft, mounting the spinner mount shaft to a bearing inside a lower chute assembly, installing a spinner disc to the spinner mount shaft, and attaching the lower chute assembly to an upper chute assembly;

attaching mounting supports onto a conveyor assembly;
    attaching a first sidewall to the conveyor assembly;
    attaching a second end wall to the first sidewall;
    attaching a second sidewall to the conveyor assembly;
    attaching a first end wall top portion to the sidewalls;
    attaching a first end wall bottom portion to the sidewalls;
    attaching cross braces to side panels;
    attaching a material diverter on the cross braces; and
    attaching the chute assembly onto the conveyor assembly.

12. The method of claim 11, wherein assembling the chute assembly is performed before assembling other components of the modular spreader device.

13. The method of claim 11, wherein the spinner sleeve, spinner mount shaft, and spinner disc are connected using threaded fasteners.

14. The method of claim 11, further comprising connecting the conveyor assembly to a host vehicle power system after assembly.

15. The method of claim 11, wherein the modular spreader device components are unpacked from a single container before assembly.

\* \* \* \* \*